United States Patent [19]

Yamagishi

[11] Patent Number: 5,546,795
[45] Date of Patent: Aug. 20, 1996

[54] METHOD AND APPARATUS FOR DIAGNOSIS OF TROUBLE IN SUPERCHARGING PRESSURE SENSOR

[75] Inventor: Yoichiro Yamagishi, Atsugi, Japan

[73] Assignee: Unisia Jecs Corporation, Atsugi, Japan

[21] Appl. No.: 452,373

[22] Filed: May 26, 1995

[30] Foreign Application Priority Data

May 26, 1994 [JP] Japan .................................. 6-112959

[51] Int. Cl.$^6$ .............................................. G01M 15/00
[52] U.S. Cl. ........................... 73/118.2; 73/116; 73/117.3
[58] Field of Search ................... 73/116, 117.2, 73/117.3, 118.1, 118.2

[56] References Cited

U.S. PATENT DOCUMENTS

| | | | |
|---|---|---|---|
| 4,761,994 | 8/1988 | Sogawa | 73/118.2 |
| 4,798,083 | 1/1989 | Sogawa | 73/118.2 |
| 4,984,456 | 1/1991 | Takahashi | 73/118.2 |
| 5,008,824 | 4/1991 | Clark et al. | 73/118.2 |
| 5,012,422 | 4/1991 | Takahashi et al. | 73/118.2 |
| 5,070,846 | 12/1991 | Dudek et al. | 73/118.2 |
| 5,095,743 | 3/1992 | Tomisawa | 73/118.1 |
| 5,191,789 | 3/1993 | Furuya | 73/118.2 |

FOREIGN PATENT DOCUMENTS

| | | |
|---|---|---|
| 58-150040 | 9/1983 | Japan . |
| 59-49334 | 3/1984 | Japan . |
| 4-191452 | 7/1992 | Japan . |

*Primary Examiner*—Richard Chilcot
*Assistant Examiner*—George M. Dombroske
*Attorney, Agent, or Firm*—Foley & Lardner

[57] ABSTRACT

In a method and apparatus for diagnosing a trouble in supercharging pressure defecting means in an internal combustion engine which is provided with a throttle valve at the downstream side of a compressor of a supercharger and a means for detecting a supercharging pressure, the trouble of the supercharging pressure detecting means is diagnosed based on the variation in the detecting value of the supercharging pressure upon at the transient operation of the engine, or by comparing the flow rate of an intake air detected at the upstream side of the compressor, the flow rate of an intake air calculated based on the variation in the supercharging pressure during the transient operation of the engine, and the detecting values of the flow rate of an intake air.

Thus, the trouble of the supercharging pressure detecting means can be diagnosed based on the detecting values during the transient operation of the engine only with a software processing and without setting a particular diagnosis period.

4 Claims, 9 Drawing Sheets

METHOD AND APPARATUS FOR DIAGNOSIS OF TROUBLE IN SUPERCHARGING PRESSURE SENSOR

FIELD OF INVENTION

The present invention relates to a method and apparatus for diagnosis of a trouble of a supercharging pressure sensor provided between a compressor part and a throttle valve in order to detect the flow rate of an intake air during transient in an internal combustion engine with a supercharger.

RELATED ART OF THE INVENTION

Conventionally, there has been known an controlling apparatus for electronically controlling a fuel supply amount to the interned combustion engine, generally referred to as an L-jetro system in which an air flow meter for directly detecting the flew rate of an intake air of an internal combustion engine is provided, and the fuel supply amount is variably set based on the amount of an intake air detected by the air flow meter (see Japanese Unexamined Patent Publication No. 58-150040 and Japanese Unexamined Patent Publication No. 59-49334).

In an Internal combustion engine of a natural suction type, in case where volume between an air flow meter and a throttle valve is relatively small, the amount of air detected by the air flow meter is substantially equal to that passing through the throttle valve.

On the other hand, in an internal combustion engine provided with a supercharger, a supercharging chamber provided between a compressor part and a throttle valve is charged with air, the amount of which is vaned based on a change in a supercharging pressure due to a transient operation of the engine. Therefore, in the internal combustion engine with the supercharger, during the transient operation of the engine, the air flow meter is designed to detect the change in the amount of air with which the supercharging chamber is filled at the same time. As a result, the amount of air detected by the air flow meter is different from the amount of air actually passing through the throttle valve by the change in the amount of air with which the supercharging chamber is filled. Accordingly, upon transient operation of the engine with the supercharger, the detecting accuracy of the intake air amount is deteriorated, so that a fuel control accuracy (air-fuel ratio control accuracy) is lowered. Thus, air-fuel ratio of the intake mixture in the engine is deviated from a target which undesirably exerts a bad influence upon an operability or an exhaust property. For overcoming this defect, there has been known a system in which a supercharging pressure sensor for detecting the supercharging pressure of a supercharging chamber is provided so that the change in the amount of air with which the supercharging chamber is filled due to the change in the supercharging pressure is calculated, and the flow rate of an intake air detected by an air flow meter is corrected based on the above mentioned change to thereby obtain the flow rate of an intake air of a cylinder (disclosed in Japanese Unexamined Patent Publication No. 4-191452).

In the case of an apparatus of a type that the flow rate of an intake air during transient operation of an engine is detected based on the change in a supercharging pressure, as stated above, if the supercharging sensor is put to a failure, and then a correct flow rate of an intake air of a cylinder cannot be advantageously detected.

SUMMARY OF THE INVENTION

In view of such prior art problems, it is an object of the present invention is to provide a method and apparatus for diagnosis of a trouble in a supercharging pressure detecting means.

Another object of the present invention is to provide a method and apparatus for diagnosis of a trouble in supercharging pressure detecting means, in which the trouble of the supercharging pressure detecting means can be diagnosed only by a software processing without adding a special hardware.

A still another object of the present invention is to provide a method and apparatus for diagnosis of a trouble in supercharging pressure detecting means, in which the trouble of the supercharging pressure detecting means can be diagnosed by employing a detecting value obtained during a transient operation of an engine without setting a particular diagnostic period.

In accordance with a first aspect of the present invention, in a method for diagnosis of trouble in a supercharging pressure detecting means which is interposed between a compressor and a throttle valve to detect the supercharging pressure of the compressor in an internal combustion engine with a supercharger, the throttle valve being provided in an air intake passage located at the downstream side of the compressor of the supercharger, the method comprises the steps of: detecting whether or not the engine is in a state of transient operation; calculating the variation in the detecting value of the supercharging pressure detecting means when it is detected that the engine is in the state of a transient operation; and diagnosing the trouble of the supercharging pressure detecting means based on the variation.

Further, in accordance with a first aspect of the present invention, an apparatus for diagnosis of a trouble in a supercharging pressure detecting means comprises: a throttle valve provided in an air intake passage located at the downstream side of a compressor of a supercharger in an internal combustion engine with a supercharger; a supercharging pressure detecting means interposed between the compressor and the throttle valve to detect the supercharging pressure of the compressor; a transient operation detecting means for detecting whether or not the engine is in the state of transient operation; and a diagnosing means for calculating the variation in the detecting value of the supercharging pressure detecting means during the transient operation of the engine detected by the transient operation detecting means and diagnosing the trouble of the supercharging pressure detecting means based on the variation.

With the method and apparatus according to the first aspect of the present invention, in case where the supercharging pressure detecting means is brought into a state of trouble, even if the supercharging pressure of a supercharging chamber changes due to a change in the amount of air with which the supercharging chamber is filled during transient operation of the engine, the supercharging pressure detecting means does not respond to this change. Accordingly, the trouble of the supercharging pressure detecting means can be diagnosed.

In this case, for example, when the variation in the detecting value of the supercharging pressure detecting means is equal to or less than a reference value, it may be diagnosed that this results from the trouble of the supercharging detecting means.

In accordance with a second aspect of the present invention, in a method for diagnosis of a trouble in a supercharging pressure detecting means which is interposed between a compressor and a throttle valve to detect the supercharging pressure of the compressor in an internal combustion engine with a supercharger, the throttle valve being provided in an air intake passage located at the downstream side of the compressor of the supercharger; the method comprises the steps of: detecting whether or not the engine is in a state of transient operation; detecting directly the flow rate of an intake air of the engine at the upstream side of said compressor when it is detected that the engine is in the state of transient operation; calculating the flow rate of an intake air corresponding to the amount of an intake air of a cylinder based on the volume of a supercharging chamber interposed between the compressor and the throttle valve and the variation portion in the supercharging pressure detected by the supercharging pressure detecting means when it is similarly detected that the engine is in the state of a transient operation; and comparing the computed flow rate of an intake air with the detected flow rate of an intake air to thereby diagnose the trouble of the supercharging pressure detecting means.

Further, in accordance with the second aspect of the present invention, an apparatus for diagnosis of a trouble in a supercharging pressure detecting means comprises; a throttle valve provided in an air intake passage located at the downstream side of a compressor of a supercharger in an internal combustion engine with a supercharger; a supercharging pressure detecting means interposed between the compressor and the throttle valve to detect the supercharging pressure of the compressor; a transient operation detecting means for detecting whether or not the engine is in the state of transient operation; an intake air flow rate detecting means for directly detecting the flow rate of an intake air of the engine at the upstream side of the compressor; an intake air flow rate calculating means for calculating the flow rate of an intake air corresponding to the amount of an intake air of a cylinder based on the volume of a supercharging chamber provided between the compressor and the throttle valve and the variation portion in the supercharging pressure detected by the supercharging pressure detecting means; and a diagnosing means for diagnosing the trouble of the supercharging pressure detecting means by comparing the flow rate of an intake or computed by the intake air flow rate calculating means with the flow rate of an intake air detected by the intake air flow rate detecting means during the transient operation of the engine detected by the transient operation detecting means.

With the method and apparatus having the above stated construction according to the second aspect of the present invention, during the transient operation of the engine, the flow rate of an intake air is corrected based on the variation portion in the supercharging pressure detected by the supercharging pressure detecting means. However, when the supercharging pressure detecting means is put to a state of trouble, a compensation portion corresponding to the variation portion of the supercharging pressure cannot be obtained. Therefore, the trouble of the supercharging pressure detecting means can be also diagnosed by comparing the corrected flow rate of an intake air with the detecting value of the flow rate of an intake air detected by the intake air flow rate detecting means.

In this case, for example, when a deviation between the calculated flow rate of an intake air and the detected flow rate of an intake air is equal to or less then a predetermined value, the trouble of a supercharging pressure sensor may be diagnosed.

These and other objects and advantages of the, present invention will become apparent to those of ordinary skill in the art after having read the following detailed description of the preferred embodiments which are illustrated in the accompanying drawings.

DESCRIPTION OF THE PREFERRED EMBODIMENTS

Figure 1:
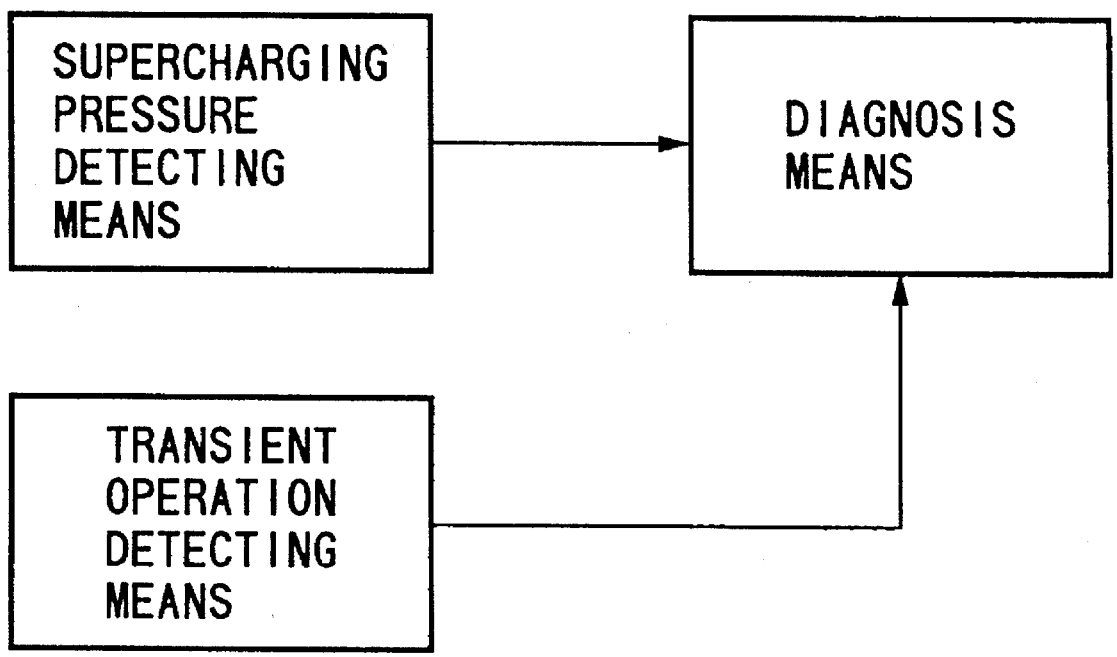
FIG. 1 is a block diagram showing a construction of a first embodiment according to the present invention.
Figure 2:
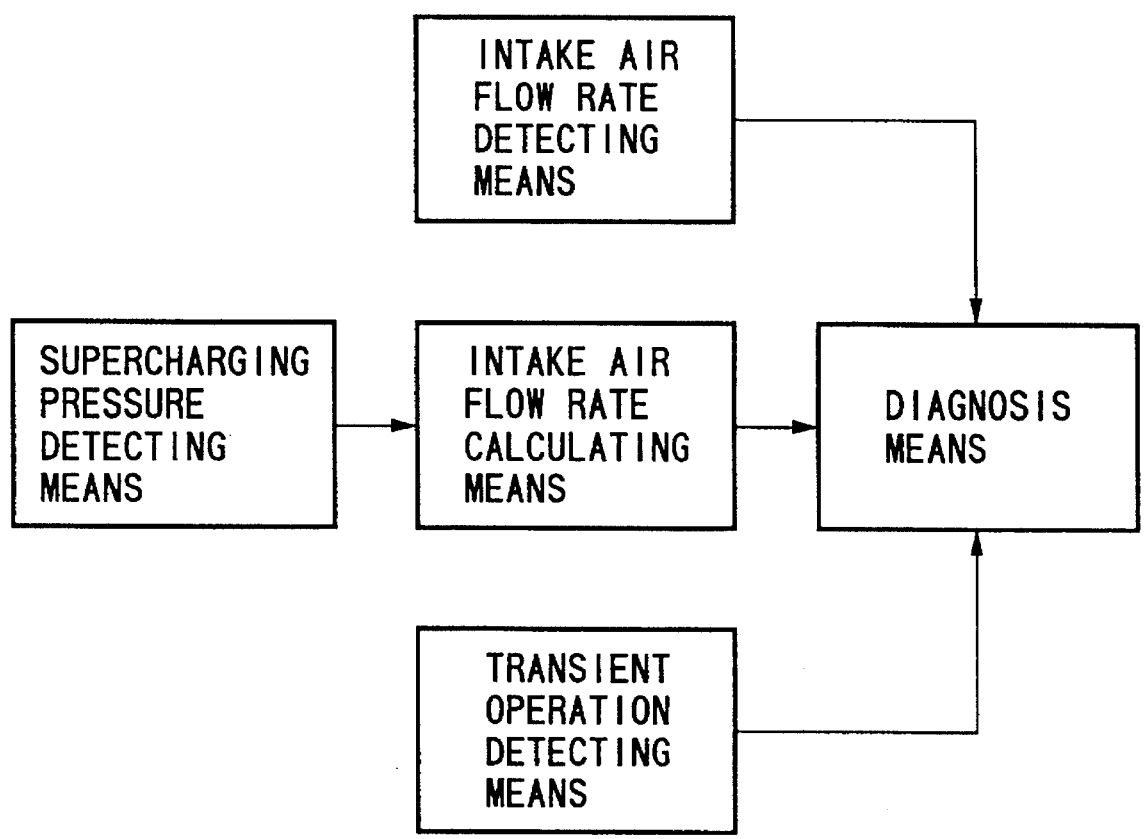
FIG. 2 is a block diagram showing a construction of a second embodiment according to the present invention.
Figure 3:
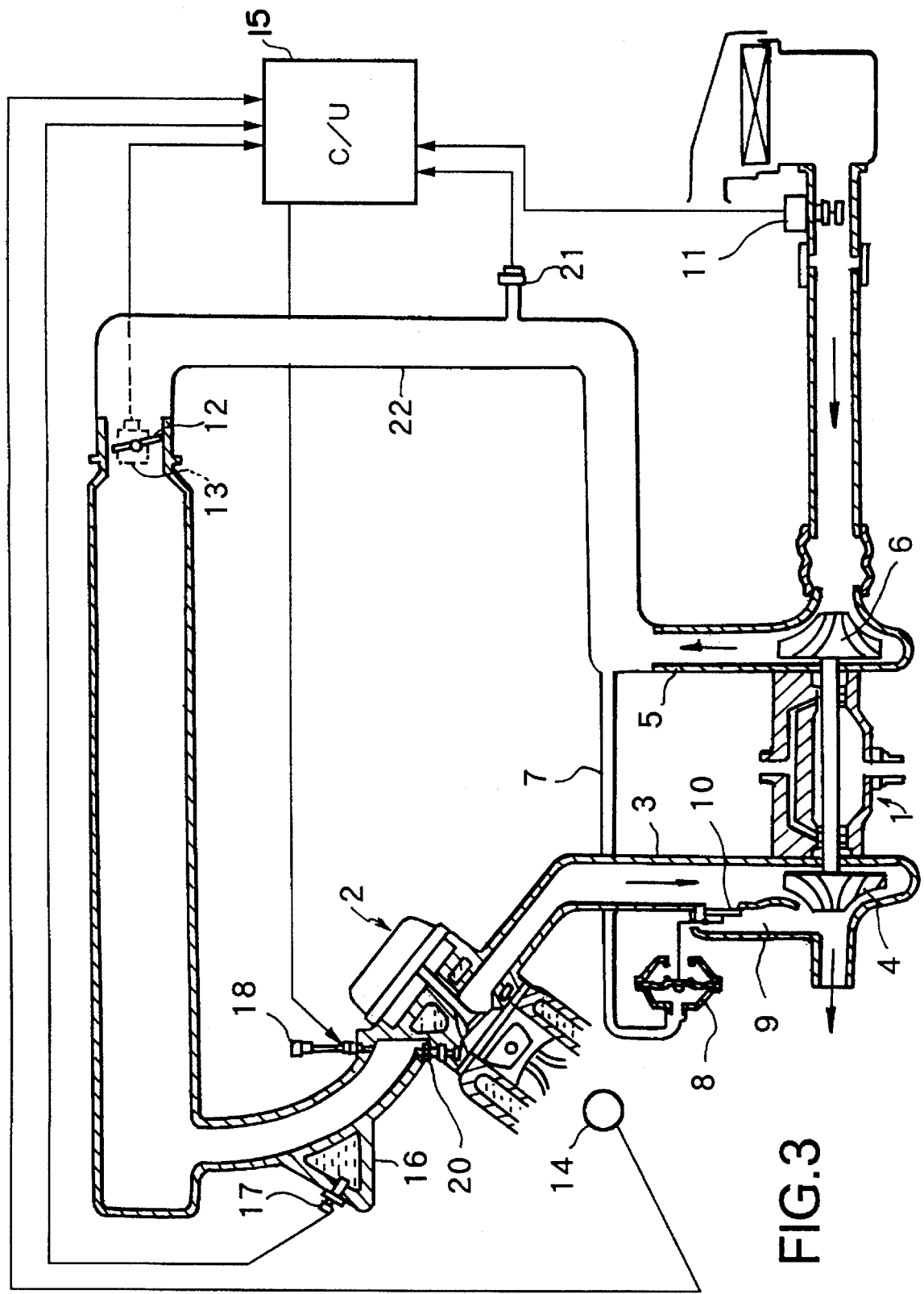
FIG. 3 is a schematic view illustrating a hardware common to the first and second embodiments according to the present invention.

Making reference to the accompanying drawings, preferred embodiments of the present invention will now be described hereinafter. Referring first to FIG. 3 illustrating the construction of a hardware common to respective embodiments, an internal combustion engine 2 provided with an exhaust turbocharger 1 as a supercharger drives and rotates an exhaust gas turbine 4 of the exhaust turbocharger 1 by virtue of the energy of an exhaust gas exhausted through an exhaust gas passage 3, to thereby drive and rotate a compressor 6 provided in an air intake passage 5 and axially connected to the exhaust gas turbine 4 so that an intake air is supercharged.

Here, the intake pressure of the air intake passage 5 provided at the downstream side of the compressor 6 is introduced to a pressure chamber of a diaphragm type actuator 8 through a pressure passage 7. The diaphragm type actuator 8 serves to drive an exhaust gas bypass valve (waste gate valve) 10 for opening or closing an exhaust gas bypass passage 9 provided bypassing the exhaust gas turbine 4 to open or close based on the pressure (supercharging pressure) introduced into the pressure chamber.

To a control unit 15 are input an intake air flow rate signal Q directly detected by an air flow member 11 of the hot-wire type or the like which is interposed in the air intake passage 5 at the upstream side of the compressor 6, a throttle valve opening signal TVO detected by a throttle sensor 13 attached to a throttle valve 12 which is interposed in the air intake passage 5 at the downstream side of the compressor 6, an engine rotational speed signal N detected by a rotational speed sensor 14 such as a crank angle sensor, a cooling water temperature signal Tw detected by a water temperature sensor 17 disposed in a water jacket 16 of the engine 2, etc.

The control unit 15 caculates and sets the basic amount of fuel injection Tp based on the flow rate of an intake air Q detected by the air flow meter 11 and the engine rotational speed N detected by the rotational speed sensor 14, This basic amount of fuel injection Tp is corrected based on the cooling water temperature Tw detected by the water temperature sensor 17, etc., so that the final amount of fuel injection Ti is set. Then, a driving pulse signal having a pulse width corresponding to the above stated amount of fuel injection Ti is output to an electromagnetic type fuel injection valve 18 at a predetermined timing synchronizing with the rotation of the engine. Thus, the fuel injection valve 18 is intermittently driven to open for the time corresponding to the above mentioned pulse width, so that a fuel is injected and supplied to the engine 2.

In each of combustion chambers, there is provided an ignition plug 20.

In the meantime, a supercharging pressure sensor 21 for directly detecting a supercharging pressure P is provided at the downstream side of the compressor 6 and at the upstream side of the throttle valve 12. The control unit 15 is so designed as to correct the flow rate of an intake air Qa detected by the air flow meter 11 based on the supercharging pressure P detected by the supercharging pressure sensor 21. The basic amount of fuel injection Tp is set based on the data of the flow rate of an intake air Qs corrected based on the above described supercharging pressure P.

In addition, in a first embodiment of the invention the trouble of the supercharging pressure sensor 21 is diagnosed based on the change amount in the detecting values during a transient operation of the engine.

A diagnostic routine of such trouble will now be described with reference to a flowchart shown in FIG. 4.

At step 81 (designated only by S in FIG. 4 similarly to other FIGS., hereinafter), the flow rate of an intake air Q detected by the air flow meter 11, an engine rotational speed N detected by the rotational speed sensor 14, the opening degree TVO of the throttle valve 12 detected by the throttle sensor 13 and the supercharging pressure P detected by the supercharging pressure sensor 21 are input.

At step 82, it is judged whether or not the above stated engine rotational speed N is located within set range $N_1 < N < N_2$.

Then, if it is judged that the engine rotational speed is located within the range set as mentioned above, control proceeds to step 83 to judge whether or not the cooling water temperature Tw is equal to or above a predetermined value $Tw_0$.

If $Tw \geq Tw_0$ is judged, control proceeds to step 84. Then, it is judged whether the engine is in a state of transient operation or not depending on whether or not a deviation $\Delta TVO$ of the preceding time value $TVO_{OLD}$ of the throttle valve opening TVO is larger than a predetermined value $\Delta TVO_0$. Accordingly, the throttle sensor 13 and the function of the step 84 constitute a transient operation detecting means.

After that, if it is judged that $\Delta TVO > TVO_0$, in other words, if it is judged that the engine is in a state of transient operation, control proceeds to step 85 to compare the variation $\Delta P$ of the supercharging pressure P (deviation between a value $P_0$ of preceding time and a current value) is compared with a reference value $\Delta P_0$.

Then, if $\Delta P \leq \Delta P_0$ is judged, it is diagnosed that the supercharging pressure sensor 21 does not catch the change of the supercharging pressure P to appear depending on the change of the amount of air with which a supercharging chamber is filled during a transient operation of the engine and the supercharging pressure sensor 21 is put to a state of trouble. At step 86, the correction of the flow rate of an intake air Q depending on the change of the supercharging pressure P is prohibited. At step 87, an alarm light MIL is turned on.

In this way, the trouble of the supercharging pressure sensor 21 can be readily diagnosed depending on whether or not the supercharging pressure P is varied during a transient operation of the engine. A reference value $\Delta P_0$ corresponding to the variation in the supercharging pressure P during a normal time of a sensor can be set and a diagnostic accuracy can be assured by setting following diagnostic conditions that the engine rotational speed N is located within a predetermined range, the cooling water temperature Tw is equal to or above the predetermined value $Tw_0$ and the variation $\Delta TVO$ of the throttle valve opening TVO is equal to or above the predetermined value $\Delta TVO_0$. Additionally sated, a reference value $\Delta TVO_0$ for judgement may be variably set depending on the variation of the throttle valve opening TVO.

A second embodiment of the invention will now be described hereinbelow. In accordance with the second embodiment of a diagnostic method and apparatus of a trouble in a supercharging pressure sensor, since the flow rate of an intake air is corrected depending on the change of a supercharging pressure during a transient operation of an engine, the corrected flaw rate of an intake air is compared with the flow rate of an intake air detected by an air flow meter to thereby diagnose the trouble of a supercharging pressure sensor.

Initially, the correction control of the flow rate of an intake air Q based on a supercharging pressure P will be described hereinbelow by referring to flowcharts shown in FIGS. 5 to 8.

In the second embodiment, an intake air flow rate detecting means is equivalent to the above stated air flow meter 11 and a supercharging pressure detecting means is equivalent to the above stated supercharging pressure sensor 21.

Figure 5:
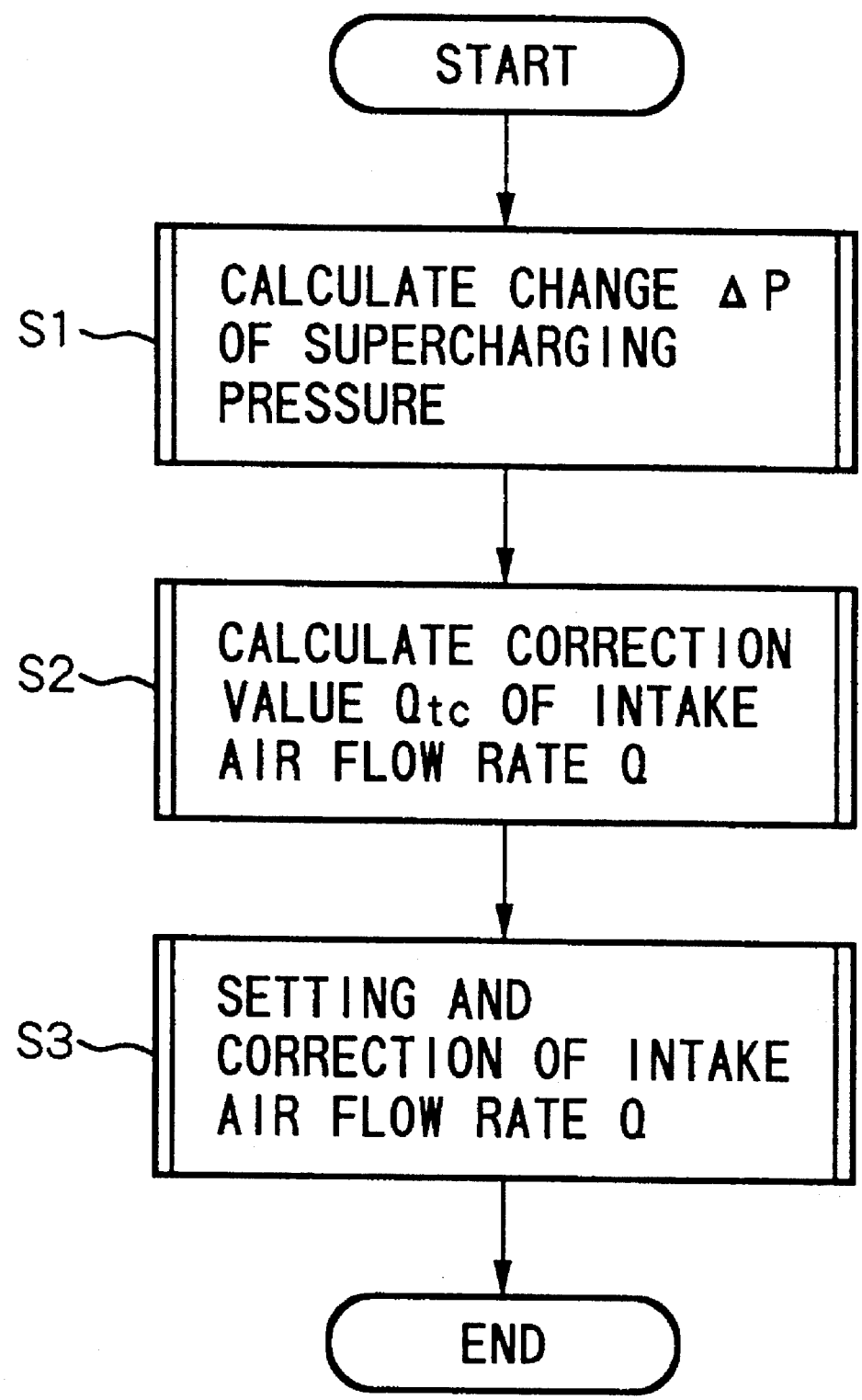
FIG. 5 is a flowchart showing a general routine for correction control of the amount of an intake air based on the change in supercharging pressure in the second embodiment according to the present invention.

A flowchart illustrated in FIG. 5 shows a general outline of a correction control based on the change of the supercharging pressure P of the flow rate of an intake air Q detected by the air flow meter 11.

At step 1, the variation $\Delta P$ of the supercharging pressure P detected by the supercharging pressure sensor 21 is calculated.

At next step 2, a correction value Qtc for correcting the flow rate Qa of an intake air Qa detected by the air flow meter 11 based on the variation $\Delta P$ of the above stated supercharging pressure P is calculated.

Then, at step 3, the flow rate of an intake air Qa detected by the air flow meter 11 is corrected by the above mentioned correction value Qtc, and the flow rate of an intake air Qs corrected and set herein is set as a final detecting value for calculating a basic fuel injection amount Tp.

In the next place, detailed processings and contents in the respective steps 1 to 3 whose outlines are heretofore described will be explained with reference to flowcharts shown in FIGS. 6 to 8.

Figure 6:
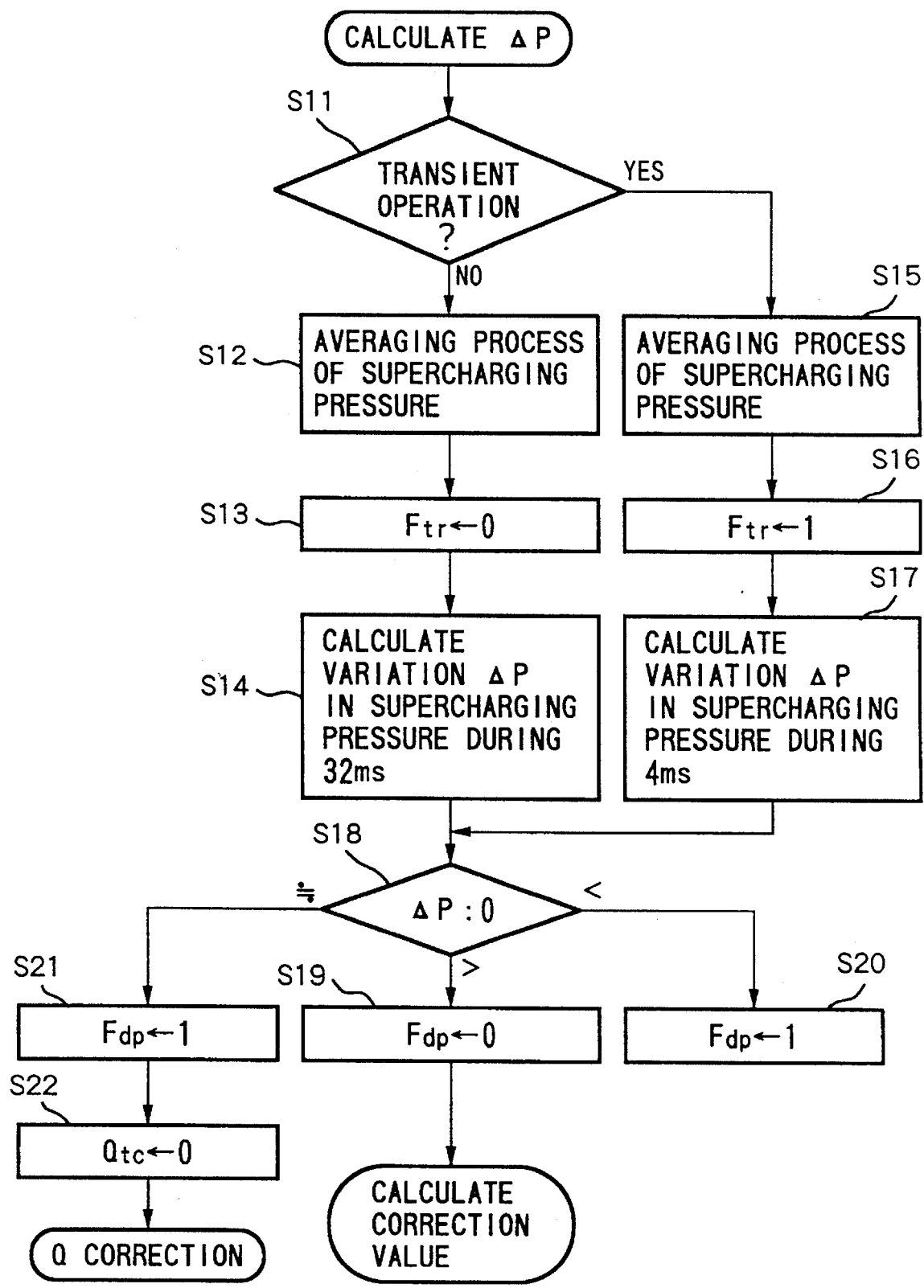
FIG. 6 is a flowchart showing a subroutine of step 1 shown in FIG. 5.

The detailed explanation about the calculation of variation $\Delta P$ stated at the step 1 is illustrated in the flowchart in FIG. 6. Herein, at step 11, it is initially discriminated whether or not the engine 2 is put to a state of transient operation, like the first embodiment, for example, based on the change of the opening degree of the throttle valve 12 detected by the throttle sensor 13.

For example, when it is discriminated that the opening degree of the throttle valve 12 is substantially constant and the engine 2 is put to a state of a steady operation at the step 11, the values detected by the supercharging pressure sensor 21 are subjected to an averaging processing at step 12. Then, at step 13, zero indicating steady operation of the engine is set to a flag Ftr for discriminating whether a transient operation or a steady operation. After that, at next step 14, from the latest value of the detecting value of the supercharging pressure averaged at step 12 is subtracted data before 32 ms, so that the variation ΔP of the supercharging pressure ΔP during 32 ms is obtained.

On the other hand, when it is discriminated that the opening degree of the throttle valve 12 changes and the engine 2 is put to a state of a transient operation, the detecting values of the supercharging pressure are subjected to an averaging processing at step 15. Then, at step 16, 1 indicating the transient operation of the engine is set to the above stated flag Ftr. After that, at step 17, from the latest value of the detecting value of the supercharging pressure averaged at the step 15 is subtracted data before 4 ms, so that the variation ΔP of the supercharging pressure P during 4 ms is obtained.

As stated above, while the supercharging pressure is subjected to the averaging processing in order to absorb the pulsation of the supercharging pressure regardless of a transient operation or a steady operation of the engine, the latest value is preferably more weighted in the averaging processing during the transient operation of the engine than during the steady operation of the engine in such a manner that the averaged value is not delayed relative to the latest detecting value. Additionally, the averaging processing may be executed only during the steady operation and this processing may not be executed during the transient operation.

The reasons why a time limit during which the variation ΔP of the supercharging pressure P is calculated is changed depending on the transient operation or the steady operation and the variation ΔP is obtained within a longer time limit during the steady operation of the engine are described in the following.

Specifically, the variation ΔP is preferably obtained within a time limit as short as possible to catch the variation ΔP with high accuracy. This is due to a fact that, when the supercharging pressure slowly changes during the steady operation of the engine, and the variation ΔP obtained within the short time limit is equal to or less than resolution, the above mentioned slow change of the supercharging pressure cannot be obtained. While the variation ΔP can be obtained as a difference between the latest value and a value 4 ms before the latest value for each 4 ms, during the transient operation, the variation ΔP is obtained as a difference between the latest value and a value 32 ms before the latest value for each 4 ms, during the steady operation of the engine. It will be understood that time as a time limit during which the above stated variation ΔP is calculated is not limited to 4 ms, 32 ms.

After the variation ΔP iS obtained, the changing direction of the supercharging pressure P is discriminated depending upon the positive or negative value of the variation ΔP at next step 18.

When the variation ΔP is a positive value and the supercharging pressure P tends to rise (at the time of acceleration), control proceeds to step 19. Then zero indicating a tendency of rise of the supercharging pressure P is set to a flag Fdp for discriminating the changing direction of the supercharging pressure P. On the contrary, when the variation ΔP is a negative value and the supercharging pressure P tends to decrease (at the time of deceleration), control proceeds to step 20 to set 1 to the flag Fdp.

In the meantime, when the variation ΔP is substantially zero and the supercharging pressure P is not changed (at the time of steady state), 1 is set to the flag Fdp st step 21, and then, zero is set to the correction value Qtc of the flow rate of an intake air Q at step 22 and the correction of the flow rate of an intake air Q based on the change of the supercharging pressure P is cancelled.

In case where the supercharging pressure P is not changed and the control proceeds to step 22, the correction value Qtc is not calculated, and the correcting calculation of the flow rate of an intake sir Q is directly executed. However, when the supercharging pressure is changed and control proceeds to step 19 or step 20, the above mentioned correction value Qtc is calculated in order to correct the flow rate of an intake air Q depending on the change of the supercharging pressure P.

Figure 7:
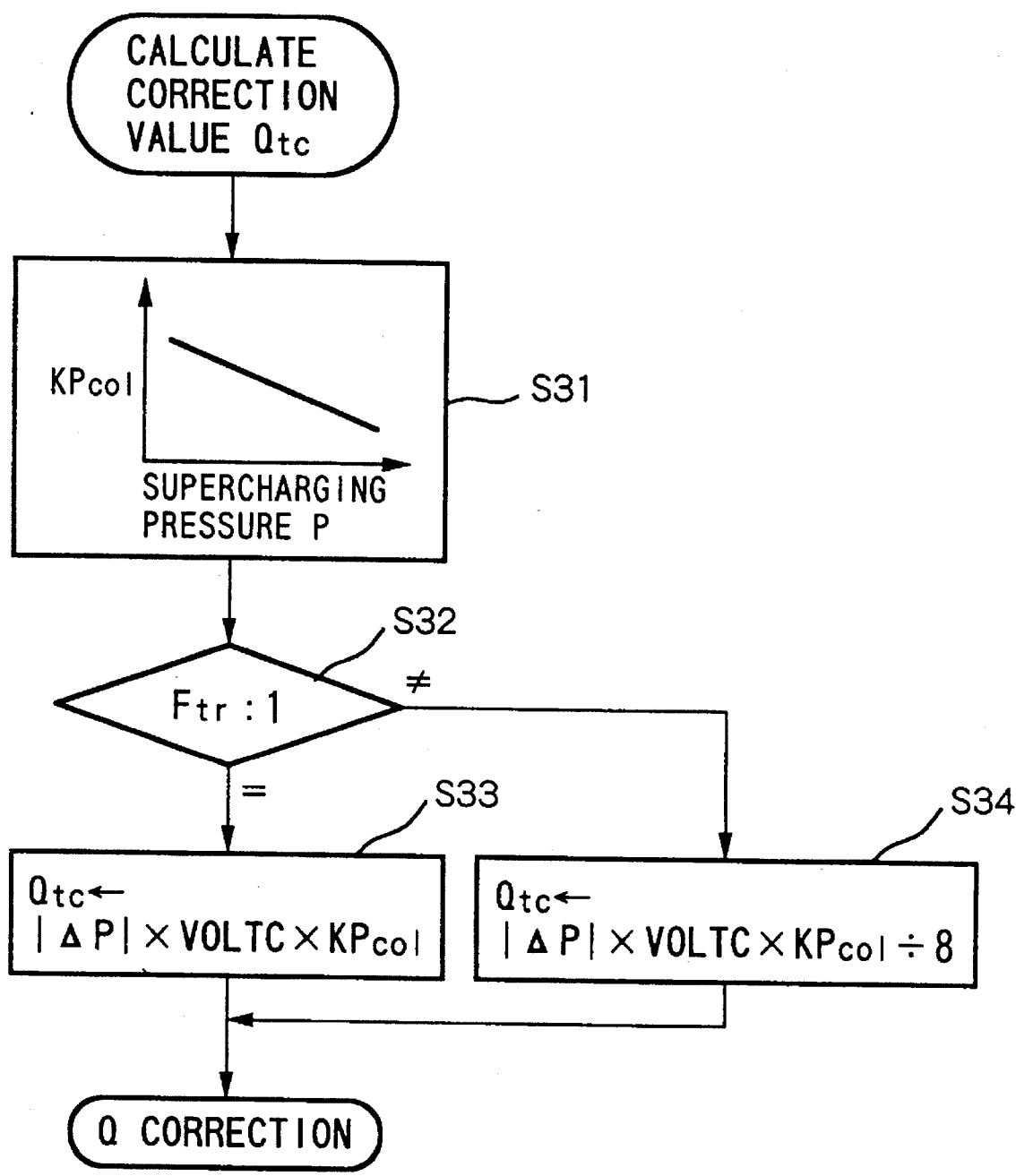
FIG. 7 is a flowchart showing a subroutine of step 2 shown in FIG. 5.

The calculation of the correction value Qtc corresponding to step 2 in the flowchart shown in FIG. 5 is illustrated in a flowchart shown in FIG. 7.

Referring to the flowchart in FIG. 7, at step 31, a correction factor KPcol based on the absolute value of the supercharging pressure P is initially retrieved and obtained from map. The above described correction factor KPcol is so set as to become a smaller value as the supercharging pressure P is increased. The characteristic of the correction factor KPcol will be described in more detail hereafter.

At next step 32, the flap Ftr set in the flowchart shown in FIG. 6 is discriminated. Under a transient operation of the engine in which 1 is set to the flag Ftr, control proceeds to step 33. Then, in accordance with an equation described below, a correction value Qtc corresponding to a variation in the amount of air filled in a supercharging chamber 22 between the compressor 6 and the throttle valve 12 is calculated.

$$Qtc \leftarrow -|\Delta P| \times VOLTC \times KPcol$$

Herein, |ΔP| designates an absolute value of the variation of the supercharging pressure during 4 ms obtained in the above mentioned step 17. VOLTC designates a constant depending on the volume of the supercharging chamber 22 provided between the compressor 6 and the throttle valve 12.

On the other hand, when it is discriminated that zero is set to the flag Ftr at step 32 and the engine 2 is in is state of a steady operation, control proceeds to step 34 and then, a correction value Qtc is calculated in accordance with a following equation.

$$Qtc \leftarrow -|\Delta P| \times VOLTC \times KPcol \div 8$$

In the case of the above described operation equation, |ΔP| designates an absolute value of the variation of the supercharging pressure P during 32 ms which is calculated in step 14. Therefore, in order to convert the absolute value into the variation during 4 ms depending on a calculating reference(4 ms) at the transient operation, it is divided by 8 (=32 ms/4 ms).

The correction of the value Qa detected by the air flow meter 11 based on the above described correction value Qtc will be described in accordance with a flowchart shown in FIG. 8.

Figure 4:
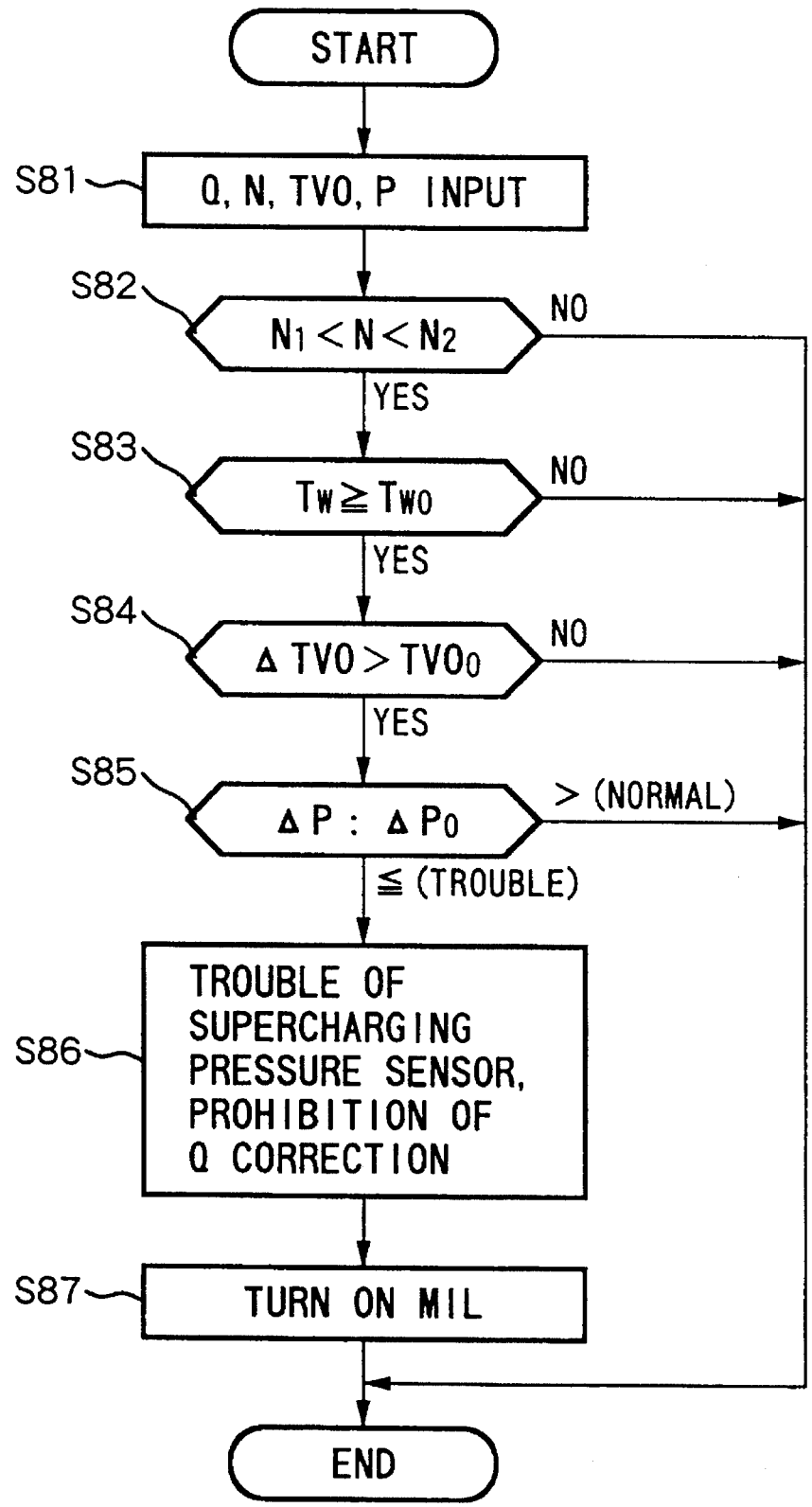
FIG. 4 is a flowchart showing a trouble diagnosis routine of a supercharging pressure sensor in the first embodiment according to the present invention.

At step 41, the flag Fdp indicating the changing direction of the supercharging pressure P set in the flowchart shown in FIG. 4 is first discriminated.

Here, when zero is set to the flag Fdp and the supercharging pressure P tends to increase, control proceeds to step 42 and the correction value Qtc is subtracted from the flow rate of an intake air Qa detected by the air flow meter 11. The result is set to a final detecting value Qs.

On the other hand, when the flag Fdp is set to 1 and the supercharging pressure P tends to decrease (or when zero is set to the correction value Qtc and the supercharging pressure is constant), control proceeds to step 43. Then, the correction value Otc is added to the flow rate of an intake air Qa. The result is set to the final detecting value Qs.

A basic fuel injection amount Tp is calculated based on the flow rate of an intake air Qs corrected and set at the above mentioned step 42 or 43. Based on the basic fuel injection amount Tp, the fuel injection valve 18 is driven and controlled, so that the fuel supply amount can be electronically controlled.

A calculation equation of the correction value Qtc based on variation $\Delta P$ of the supercharging pressure P will be specifically described hereinbelow.

In an internal combustion engine provided with a supercharger as in the case of the present embodiment, when it is assumed that an air intake passage located between the compressor of the supercharger and the throttle valve is a supercharging chamber 22, the amount of air with which the supercharging chamber 22 is filled is changed depending upon the change of the supercharging pressure, and the air flow meter 11 detects the change in the amount of air with which the supercharging chamber is filled as well as the amount of air passing through the throttle valve. Therefore, in order to have an actual amount of air passing through the throttle valve, the change in the amount of air with which the supercharging chamber is filled has to be corrected.

Thus, the amount of air Qcol with which the supercharging chamber 22 is filled can be calculated in accordance with an equation as described below.

$$Qcol = \rho1 \times Vcol$$
$$= \rho0 \times (T0/T1) \times (P1/P0) \times Vcol$$

In the above equation, $\rho1$ designates an actual air density of the supercharging chamber 22, Vcol a volume of the supercharging chamber 22, $\rho0$ a reference air density, T0 a reference temperature of air in the supercharging chamber 22, T1 an actual temperature of air in the supercharging chamber 22, P1 an actual supercharging pressure and P0 a reference pressure.

In the above described equation, when it is assumed that the supercharging pressure after a predetermined time $\Delta\Delta$is P2, and temperature is T2, the variation $\Delta Qcol$ of the amount of air Qcol with which the supercharging chamber is filled per unit time $\Delta t$ is calculated in accordance with a following equation.

$$\Delta Qcol = (Qcol2 - Qcol1)/\Delta t$$
$$= \rho0 \times (T0/P0) \times Vcol \times (P2/T2 - P1/P1)/\Delta t$$

Herein, when it is assumed that the air in the supercharging chamber 22 is adiabatically changed, $T/T2=(P2/P1)^{(1/n-1)}$, in accordance with an equation for a polytropic change. Therefore, the calculation equation of the variation $\Delta Qcol$ in the amount of air with which the supercharging chamber is filled is represented by the following equation.

$$\Delta Qcol = \rho0 \times Vcol \times (P1/P0)^{1/n} \times \{(P2/P1)^{1/n}\}/\Delta t$$

In the equation of the above stated variation Qcol in the amount of air with which the supercharging chamber is fitted, when it is assumed that a polytropic exponent n is 1.4 and the change of the supercharging pressure (P2–P1) is small, an equation described below is established.

$$(P2/P1)^{1/n} - 1 = 0.7143 \times (P2/P1)P1$$

Accordingly, the above mentioned Qcol can be expressed by the following equation.

$$\Delta Qcol = \rho0 \times Vcol \times (P1/P0)^{1/n} \times 0.7143 \times (P2/P1)/(P1 \times \Delta t) \quad (1)$$

In the above equation (1), $\rho0 \times Vcol \times 0.7143/\Delta t$ is a constant and $(P1/P0)^{1-n}/P1$ is a factor determined by P1. Therefore, when it is assumed that $\rho0 \times Vcol \times 0.7143/\Delta t = VOLTC$, and further, the value of $(P1/P0)^{1-n}/P1$ is retrieved from a map based on the supercharging pressure P and given as KPcol, the above described equation (1) is simplified by an equation mentioned below and used in the above mentioned embodiment. According to this equation, a variation in the amount of air with which the supercharging chamber is filled can be estimated based on the volume Vcol of the supercharging chamber, the change P of the supercharging pressure and the absolute value P of the supercharging pressure.

$$\begin{aligned} Qtc &= \Delta Qcol \quad (2) \\ &= VOLTC \times (P2 - P1) \times KPcol \\ &= VOLTC \times |\Delta P| \times KPcol \end{aligned}$$

Specifically, if the variation $\Delta P=(P2-P1)$ of the supercharging pressure P during a predetermined time $\Delta t$ is obtained, and KPcol is obtained based on the absolute value of the supercharging pressure P by referring to the map, and then, the variation Qcol in the amount of air with which the supercharging pressure chamber 22 is filled can be obtained. When the supercharging pressure P tends to rise (P2>P1), the amount of air with which the supercharging chamber is filled is increased by $\Delta Qcol$. Since such an increase in the amount of air with which the supercharging chamber is filled is also inclusively detected by the air flow meter 11, if the $\Delta Qcol$ (Qtc) is subtracted from the detecting value Qa, a real amount of air passing through the throttle valve excluding the variation in the filled amount of air depending on the change of the supercharging pressure can be obtained.

Similarly, when the supercharging pressure P tends to decrease (P2<P1), the amount of air with which the supercharging chamber 22 is filled is decreased by $\Delta Qcol$, the air flow meter 11 detects the amount of air passing through the throttle valve which is less by such a decrease than a real amount of air passing through the throttle valve. Therefore, if the above stated $\Delta Qcol$ (Qtc) is added to the detecting value Qa, the real amount of air passing though the throttle valve excluding the variation in the filled amount of air due to the change of the supercharging pressure can be obtained.

The above mentioned correction factor KPcol is, as mentioned before, equivalent to the above described $(P1/P0)^{1/n}/P1$, it has a characteristic to decrease substantially depending on the increase of the supercharging pressure, as clearly illustrated in the flowchart in FIG. 7. In this case, the above state $(P1/P0)^{1/n}/P1$ may be calculated without employing the map. However, it is more preferable to use the map for the purpose of simplifying the calculation.

A condition under which the change in the supercharging pressure is maximized requires an acceleration from a low load (non supercharging area). Therefore, in the above mentioned equation (1), assuming that P1=P0, $(P1/P0)^{1/n}$ is approximated to 1. Thus, the equation of $\Delta Qcol$ is simplified as expressed below.

$$\Delta Qcol = p0 \times Vcol \times 0.7143\{(P2/P1)/P1\}/\Delta t$$

Herein, when it is deemed that P1 of a denominator in (P2–P1)/P1 is substantially equal to P0, values except (P2–P1) are constants. Thus, assuming that VOLTC=p0×Vcol× {0.7143/P0}/Δt, an equation described below will be obtained.

$$\Delta Qcol = VOLTC \times (P2-P1) \qquad (3)$$

Consequently, the variation ΔQcol in the amount of air with which the supercharging chamber 22 is tilted which corresponds to an error detected by the air flow meter 11 can be estimated based on the volume Vcol of the supercharging chamber 22 located between the compressor 6 and the throttle valve 12 and the amount of change ΔP in the supercharging pressure P.

In this case, if the variation in the amount of air with which the supercharging chamber is filled is estimated by saving a correction term based on the absolute level of the supercharging pressure P as indicated by the equation (3), and then, a serious error will be produced due to a change in the absolute level. Therefore, it is preferable to calculate the variation ΔQcol in the filled amount of air including the correction factor KPcol determined by the absolute value of the supercharging pressure P, as expressed by the above equation (2).

Figure 9:
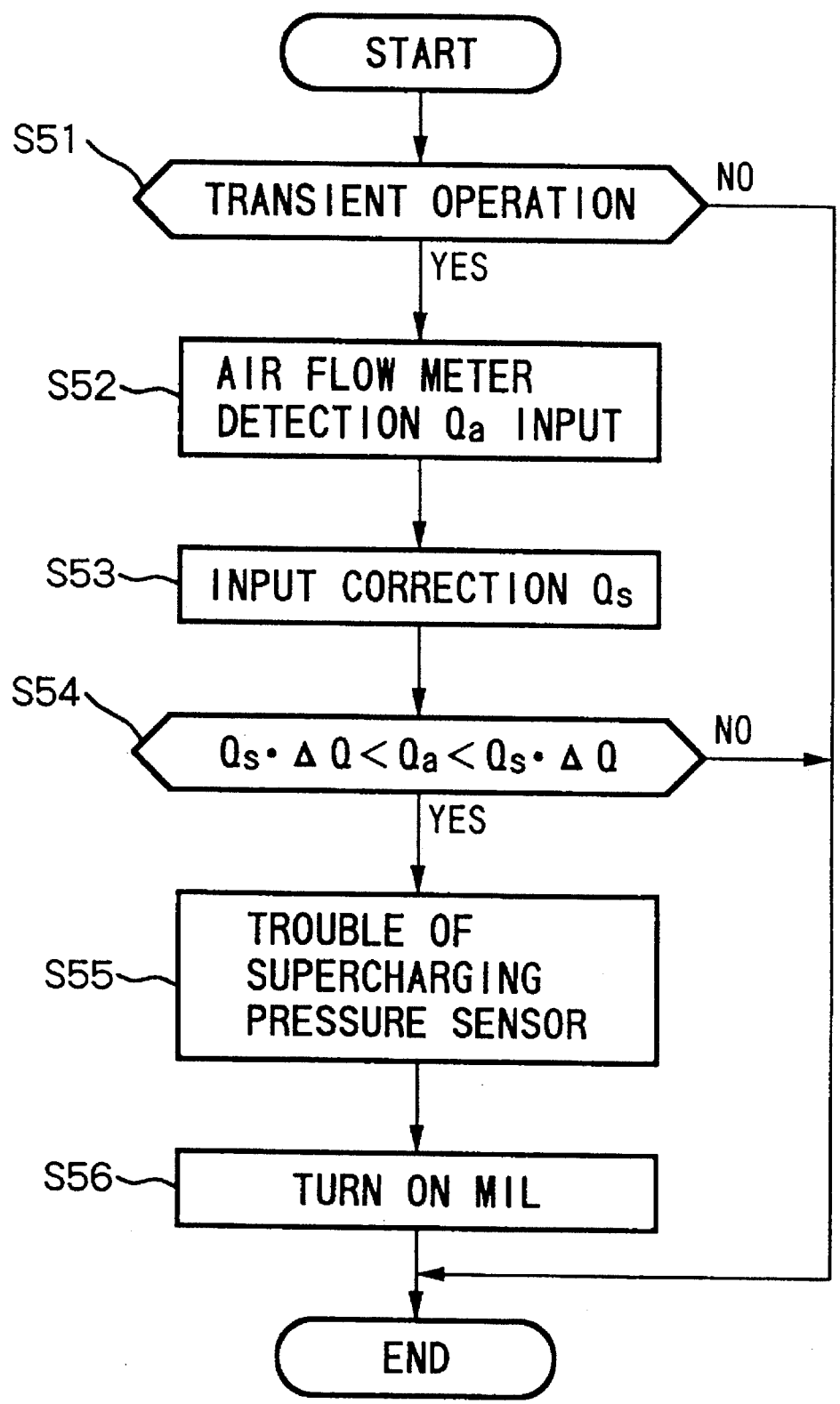
FIG. 9 is a flowchart showing a trouble diagnosis routine of a supercharging pressure sensor in the second embodiment according to the present invention.

Now, with reference to a flowchart shown in FIG. 9, there will be described a routine for diagnosing the trouble of a supercharging pressure sensor by comparing the flow rate of an intake air corrected based on the change in the supercharging pressure as mentioned above with the flow rate of an intake air detected By the air flow meter.

At step 51, it is judged whether or not the engine is in a state of a transient operation. This judgement may be made based on the value of the flag Ftr set in accordance with the judgement at step 11. Further, similarly to the above mentioned first embodiment, the establishment of the conditions of steps 81 to 84 in FIG. 4 may be preferably considered a,s conditions for judgement of the transient operation.

At step 52, the flow rate of an intake air Qa detected by the air flow meter 11 is input.

Figure 8:
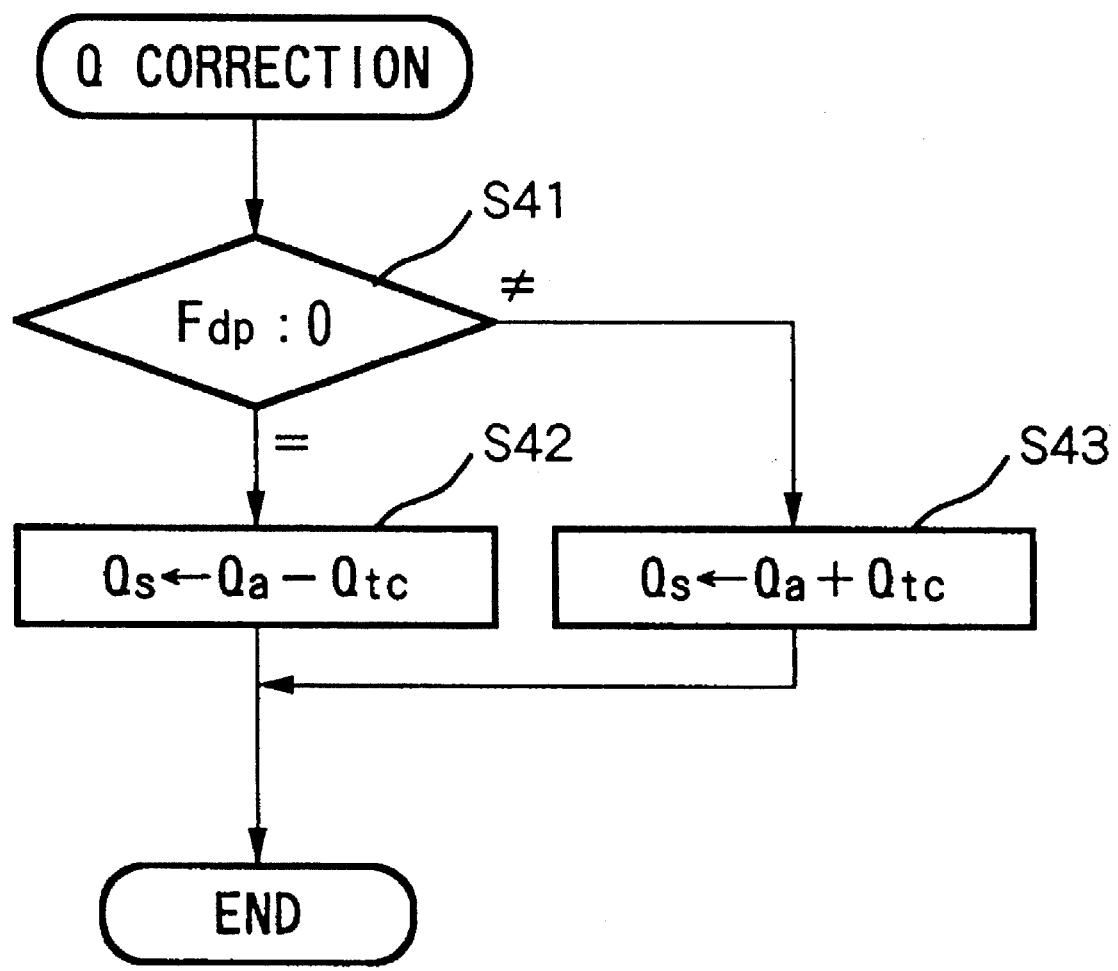
FIG. 8 is a flowchart showing a subroutine of step 3 shown in FIG. 5.

At step 53, the flow rate of an intake air Qs corrected as shown in FIG. 8 is input.

At step 54, it is judged whether or not the detecting value Qa is located within a range of values obtained by adding a hysteresis ΔQ to or subtracting it from the correction value Qs.

Then, if the detecting value Q is located within the above described range, it is diagnosed at step 55 that this is because of the trouble of the supercharging pressure sensor 21. Thus, the use of the above described correction value Qs is prohibited and an alarm light MIT is turned on at step 56.

In this manner, since the flow rate of an intake air is corrected depending on the change in the supercharging pressure during a transient operation of the engine, the corrected flow rate of an intake air is compared with the flow rate of an intake air detected by the air flow meter. Then, when the former is equal to the latter, it may be diagnosed that the supercharging pressure sensor is put to a state of trouble.

Although, in the above mentioned embodiments, the engine provided with the exhaust turbocharger 1 as a supercharger has been described, a supercharger of a type which is directly engine-driven may be employed.

The transient operation of the engine may be detected depending on the variation in the opening degree of the throttle valve, as well as the variation in the flow rate of an intake air detected by the air flow meter 11.

As heretofore mentioned, in accordance with the present invention, the trouble of the supercharging pressure detecting means can be diagnosed only by a software processing without adding a special hardware. Further, the trouble of the supercharging pressure detecting means can be diagnosed based on the detecting values during the transient operation of the engine without setting a particular diagnostic period.

I claim:

1. A method for diagnosis of a detecting error in a supercharging pressure detector which is interposed between a compressor and a throttle valve, said supercharging pressure detector being operable to detect a supercharging pressure of the compressor in an internal combustion engine which induces a supercharger, said throttle valve being provided in an air intake passage located at a downstream side of said compressor; said method comprising the steps of:

detecting whether or not the engine is in a state of transient operation;

detecting directly a flow rate of an intake air of the engine at an upstream side of said compressor when the engine is in the state of transient operation;

calculating the flow rate of an intake air corresponding to an amount of an intake air of a cylinder of the engine based on a volume of air in a supercharging chamber interposed between said compressor and said throttle valve and a variation in the supercharging pressure detected by said supercharging pressure detector when the engine is in the state of transient operation; and comparing the calculated flow rate of an intake air with the detected flow rate of an intake air to thereby diagnose the detecting error of the supercharging pressure detector, wherein said supercharging pressure detector is diagnosed as having the detecting error when a deviation between the calculated flow rate of an intake air and the detected flow rate of an intake air is equal to or less than a first value.

2. A method for diagnosis of a detecting error in a supercharging pressure detector according to claim 1, wherein when the engine is not operating in the state of transient operation, the supercharging pressure is detected by the supercharging pressure detector sequentially at first instants in time corresponding to integer multiples of a first amount of time, wherein when the engine is operating in the state of transient operation, the supercharging pressure is detected by the supercharging pressure detector sequentially at second instants in time corresponding to integer multiples of a second amount of time, wherein the first amount of time is an integer multiple of the second amount of time, and wherein the variation of the supercharging pressure is determined by said supercharging pressure detector at the second instants of time when the engine is in the state of transient operation.

3. An apparatus for diagnosis of a detecting error in a supercharging pressure detector, comprising:

a throttle valve provided in an air intake passage located at a downstream side of a compressor of a supercharger in an internal combustion engine;

said supercharging pressure detector interposed between said compressor and said throttle valve and configured to detect a supercharging pressure of said compressor;

a transient operation detecting means for detecting whether or not the engine is in a state of transient operation;

an intake air flow rate detecting means for directly detecting a flow rate of an intake air of the engine at an upstream side of said compressor;

an intake air flow rate calculating means for calculating the flow rate of an intake air corresponding to an amount of an intake air of a cylinder of the engine based on a volume of a supercharging chamber provided between said compressor and said throttle valve and a variation in the supercharging pressure detected by said supercharging pressure detector over a predetermined time period; and a diagnosing means for diagnosing the detecting error of the supercharging pressure detector by comparing the flow rate of an intake air calculated by said intake air flow rate calculating means with the flow rate of an intake air detected by said intake air flow rate detecting means during the transient operation of the engine detected by said transient operation detecting means, wherein said diagnosing means diagnoses that said supercharging pressure detector has the detecting error when a deviation between the flow rate of an intake air calculated by said intake air flow rate calculating means and the flow rate of an intake air detected by said intake air flow rate detecting means is equal to or less than a predetermined value.

4. An apparatus for diagnosis of a detecting error in a supercharging pressure detector according to claim 3, wherein when the engine is not operating in the state of transient operation, the supercharging pressure is detected by the supercharging pressure detector sequentially at first instants in time corresponding to integer multiples of a first amount of time, wherein when the engine is operating in the state of transient operation, the supercharging pressure is detected by the supercharging pressure detector sequentially at second instants in time corresponding to integer multiples of a second amount of time, wherein the first amount of time is an integer multiple of the second amount of time, and wherein the variation of the supercharging pressure is calculated by the intake air flow rate calculating means at the second instants of time when the engine is in the state of transient operation.

* * * * *